US012651093B2

(12) United States Patent
Rodriguez Bravo et al.

(10) Patent No.: US 12,651,093 B2
(45) Date of Patent: Jun. 9, 2026

(54) PROTECTING DATA STORED BY A NON-VOLATILE MEMORY

(71) Applicant: Kyndryl, Inc., New York, NY (US)

(72) Inventors: Cesar Augusto Rodriguez Bravo, Alajuela (CR); David Alonso Campos Batista, Aurora (CR); Thomas Brackhahn, Garches (FR)

(73) Assignee: Kyndryl, Inc., New York, NY (US)

( * ) Notice: Subject to any disclaimer, the term of this patent is extended or adjusted under 35 U.S.C. 154(b) by 165 days.

(21) Appl. No.: 18/426,441

(22) Filed: Jan. 30, 2024

(65) Prior Publication Data

US 2025/0053692 A1    Feb. 13, 2025

(30) Foreign Application Priority Data

Aug. 10, 2023    (EP) .................................... 23315310

(51) Int. Cl.
*G06F 21/75*    (2013.01)
*G06F 21/55*    (2013.01)

(52) U.S. Cl.
CPC .......... *G06F 21/755* (2017.08); *G06F 21/552* (2013.01)

(58) Field of Classification Search
CPC ...... G06F 21/755; G06F 21/552; G06F 21/79; G06F 2221/2143
See application file for complete search history.

(56) References Cited

U.S. PATENT DOCUMENTS

| | | | | |
|---|---|---|---|---|
| 7,340,576 | B1 * | 3/2008 | Therene .............. | G06F 12/0804 |
| | | | | 711/112 |
| 8,566,940 | B1 * | 10/2013 | Rudelic .............. | G06F 12/1425 |
| | | | | 711/100 |
| 9,336,387 | B2 * | 5/2016 | Allison ................. | G06F 3/0625 |
| 10,032,019 | B2 * | 7/2018 | Allison ................. | G06F 3/0634 |
| 11,494,522 | B2 * | 11/2022 | Meier ..................... | G06F 21/79 |

(Continued)

FOREIGN PATENT DOCUMENTS

| | | |
|---|---|---|
| CN | 101465164 A | 6/2009 |
| CN | 101706853 B | 5/2011 |

(Continued)

OTHER PUBLICATIONS

Acronis, "9112: S.M.A.R.T. Attribute: Power Cycle Count," URL: https://kb.acronis.com/content/9112; Retrieved: Apr. 3, 2023; 1 page.

(Continued)

*Primary Examiner* — Lynn D Feild
*Assistant Examiner* — Abdullah Almamun
(74) *Attorney, Agent, or Firm* — CANTOR COLBURN LLP; Erik Swanson

(57)    ABSTRACT

One or more embodiments relate to protecting data stored by a non-volatile memory of a memory device installed in a computing device. A technique includes in response to a power-up of the memory device, incrementing a memory power cycle count, and receiving a host power cycle count indicating a number of power-ups of the computing device. The technique includes, if the memory power cycle count is not equal to the host power cycle count, applying a security reaction to the memory, the security reaction being adapted for preventing a readout of the data.

20 Claims, 1 Drawing Sheet

(56)                    References Cited

U.S. PATENT DOCUMENTS

| | | | |
|---|---|---|---|
| 2008/0307494 A1* | 12/2008 | Holtzman | G06F 21/725 |
| | | | 726/2 |
| 2009/0292875 A1* | 11/2009 | Therene | G06F 11/1441 |
| | | | 711/E12.019 |
| 2019/0243637 A1* | 8/2019 | Nachimuthu | G06F 3/0632 |
| 2022/0244966 A1* | 8/2022 | Nguyen | G06F 9/4405 |
| 2023/0017591 A1 | 1/2023 | Muchherla et al. | |
| 2023/0057004 A1* | 2/2023 | Reina | H04L 9/0866 |
| 2025/0006236 A1* | 1/2025 | Kerstetter | G11C 7/22 |

FOREIGN PATENT DOCUMENTS

| CN | 104461945 A | 3/2015 |
|---|---|---|
| CN | 113656846 A | 11/2021 |
| CN | 215730877 U | 2/2022 |

OTHER PUBLICATIONS

Hackworth, "Could Your Printer Be a Security Risk Because It Saves a Copy of Your Data?" URL: https://www.hackworth.co/could-your-printer-be-a-security-risk-because-it-saves-a-copy-of-your-data/; Retrieved: Apr. 3, 2023; 9 pages.

* cited by examiner

PROTECTING DATA STORED BY A NON-VOLATILE MEMORY

BACKGROUND

The present invention relates to a method of protecting data stored by a non-volatile memory of a memory device installed in a computing device, and a corresponding computer program product and devices.

One of the biggest risks that companies face is associated with physical security. In fact, many companies focus on digital security, which makes them more vulnerable to types of attacks exploiting vulnerabilities of physical security. Among the risks related to physical security is the disclosure of sensitive information like trade secrets, client data, financial data, sensitive personal information (SPI), etc. That sensitive information can be contained in all types of computing devices, including internet-of-things (IoT) devices like cameras, network devices, smart devices, projectors, and network printers. Network printers are an instructive example, and they usually have at least 1 gigabyte (GB) of internal memory that is used to cache documents in a network printer pool. This means that an attacker may be able to retrieve thousands of documents that have been sent to that printer by gaining physical access to the memory.

Attackers know that stealing an entire computing device such as a network printer may be difficult, so a new threat has been seen in which the attackers will just extract the memory of the device, which is usually very small and easy to conceal. A common misconception is that extracting the memory from IoT devices is difficult. Several types of internal memories are common in IoT devices: embedded memory, which means the memory is soldered to the device (i.e., tools are required to remove the memory); connected memory, which means that the memory is connected to an internal slot and can be easily removed, but may render the computing device inoperable at least until the device is rebooted; and removable memory that is attached to an internal port such as a Universal Serial Bus (USB) or a Secure Digital (SD) port and may be removed while the computing device is switched on.

The use of removable memory has been increasing because memory devices of this category are extremally cheap and easy to obtain (especially at storage capacities up to 10 GB) and replace (e.g., to fix or upgrade the device), so they have become a good option for many IoT device assemblers and manufacturers. Moreover, circuit boards of IoT devices may be used as standard components for several devices and models; therefore it may be easier (and cheaper) for manufacturing companies to create a standard board without soldered memory so that the final assembler company can add the required memory based on the device type and model.

SUMMARY

In one aspect, the invention relates to a computer-implemented method of protecting data stored by a non-volatile memory of a memory device installed in a computing device, the method comprising: in response to a power-up of the memory device, incrementing a memory power cycle count; receiving a host power cycle count indicating a number of power-ups of the computing device; if the memory power cycle count is not equal to the host power cycle count, applying a security reaction to the memory, the security reaction being adapted for preventing a readout of the data.

In a further aspect, the invention relates to a computer program product comprising a computer readable storage medium having program instructions embodied therewith, the program instructions being executable by a processor functionally coupled to a non-volatile memory of a memory device installed in a computing device to cause the processor to perform a method of protecting data stored by the memory, the method comprising: in response to a power-up of the memory device, incrementing a memory power cycle count; receiving a host power cycle count indicating a number of power-ups of the computing device; if the memory power cycle count is not equal to the host power cycle count, applying a security reaction to the memory, the security reaction being adapted for preventing a readout of the data.

In a further aspect, the invention relates to a memory controller, configured for controlling a non-volatile memory of a memory device installed in a computing device, the controlling comprising performing a method of protecting data stored by the memory, the method comprising: in response to a power-up of the memory device, incrementing a memory power cycle count; receiving a host power cycle count indicating a number of power-ups of the computing device; if the memory power cycle count is not equal to the host power cycle count, applying a security reaction to the memory, the security reaction being adapted for preventing a readout of the data.

In a further aspect, the invention relates to a memory device comprising a non-volatile memory and the memory controller configured for controlling the non-volatile memory of the memory device.

In a further aspect, the invention relates to a computing device comprising a processor and the memory device functionally coupled to the processor.

Embodiments of the invention are given in the dependent claims. Embodiments of the present invention can be freely combined with each other if they are not mutually exclusive.

BRIEF DESCRIPTION OF THE DRAWINGS

In the following, embodiments of the invention are explained in greater detail, by way of example only, making reference to the drawings in which.

DETAILED DESCRIPTION

Figure 1:
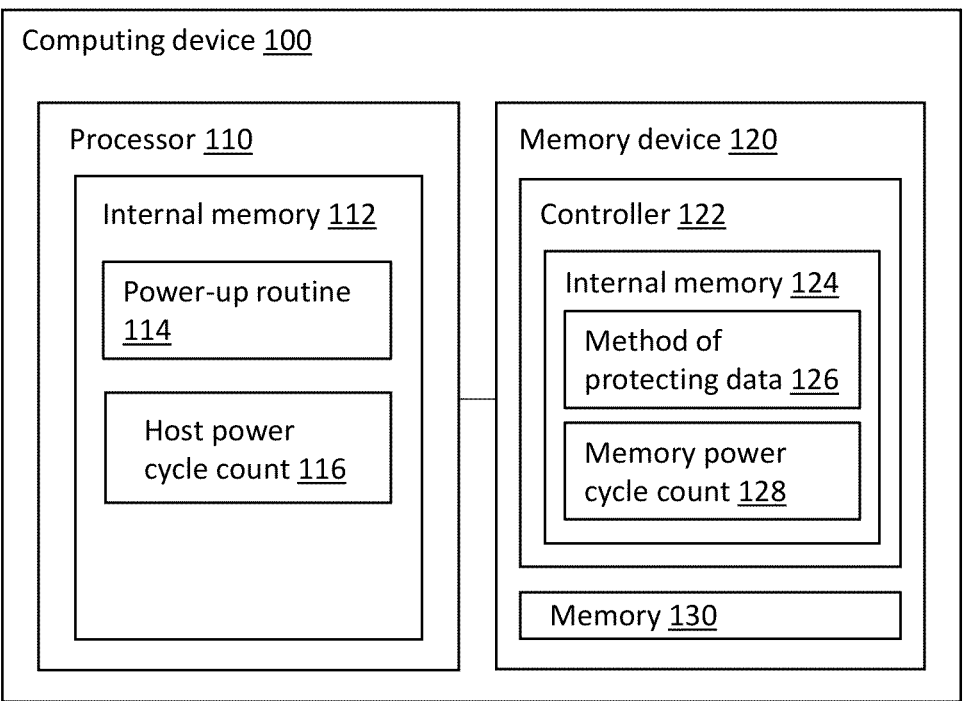
FIG. 1 depicts a block diagram illustrating components of a computing device.

Access to data stored by a removable or connected non-volatile memory device may be facilitated by removing the memory device from the computing device where it is originally installed and bringing it into functional coupling with a different computing device that is also capable of reading the data from the memory. In view thereof, an approach is desirable that limits access to the data to scenarios where usage of the memory is authorized.

The method disclosed herein relates to non-volatile computer memory that is a component of a memory device integrated with a particular computing device. The computing device may be a general computer equipped with a processor in functional coupling with memory, including but not limited to internet-of-things (IoT) devices. Not necessarily may the computing device be manufactured with the memory device onboard, nor may it be necessary that the memory device be manually removable without a tool from a memory connector of a circuit board of the computing device or an internal device connector port of the computing device. The non-volatile memory may implement a non-volatile storage technology such as a solid-state memory, a magnetic memory (e.g., a hard disk drive), an optical memory, etc. The use of the non-volatile memory by the computing device is not restricted, i.e., the non-volatile memory may be a primary memory or random-access memory (RAM), a mass storage device, a cache, etc. The memory may be a fixed component of the memory device that cannot be detached from the memory device without using a tool. In one or more embodiments, the memory device comprises a memory controller configured for operating the memory, which may include that the memory controller may be configured (e.g., programmed and/or hardcoded) to perform the method (i.e., execute code implementing the method) disclosed herein for protecting data stored by the memory. Nonetheless, it may be possible that a different processor of a computing device (e.g., a central processing unit (CPU), a northbridge, etc.) where the memory is installed may perform the method as well.

A power-up event causes the memory device to get supplied with electric power. The processor executing the method may be configured to store a memory power cycle count (in short, the "memory count") in a non-volatile register or other non-volatile memory onboard or remote to the memory device or the computing device, and to increment the counter when the memory is powered up. In an example, the memory device supports Self-Monitoring, Analysis and Reporting Technology (SMART) and the memory power cycle count is available as a SMART attribute.

Independent thereof, the computing device may be configured for storing in a non-volatile register or other non-volatile memory onboard or remote to the memory device or the computing device a host power cycle count (in short, the "host count") that is incremented when the computing device (e.g., its mainboard) is powered up to record the number of times the computing device has been powered up. In an example, the memory count is stored by the memory or a non-volatile register or memory of the memory controller onboard the memory device, and the host count is stored by a non-volatile register or memory of a chipset processor or main processor of the computing device (e.g., an ESP8266, Atmega32u4, etc.).

The processor performing the method may receive the host count, e.g., by querying the host count from a processor managing the host count, by retrieving the host count from a memory where it is stored, and/or by automatic transmission of the host count by the processor managing the host count. If the memory device is powered up each time the computing device is powered up, and if the memory count has been synchronized with the host count during a trusted process (e.g., during assembly of the computing device with the memory device, or during an authorized hardware upgrade), the memory count may equal the host count. Comparison of the memory count to the host count may be time sensitive, e.g., if it can be assumed that the host count is regularly incremented earlier than the memory count, the memory count may be checked for equality to the host count after incrementing the memory count at memory power-up, and/or may be checked for equality to the host count minus one before being incremented; if it can be assumed that the host count is regularly incremented later than the memory count, the memory count may be checked for equality to the host count before incrementing the memory count at memory power-up, and/or may be checked for equality to the host count plus one after having been incremented. In an example, the method is performed during memory power-up, i.e., before read/write operations of the memory are possible or allowed.

If the comparison of the memory power cycle count and the host power cycle count (taking into consideration all applicable corrections, as outlined above, for instance) returns equality, this may be interpreted as an indication of a proper use of the memory device onboard the computing device, and the method may continue with normal operation of the memory without taking additional action. If the comparison returns inequality, the method may proceed with applying a security reaction to the memory that prevents readout of data from the memory.

Hence, the method may make use of independent counter values of the number of power cycles performed by the memory and the computing device. If the memory device is detached from the computing device and is brought into functional coupling with another computing device, it is unlikely that the memory device and the other computing device will have the same power cycle counts. Thus, the separately recorded power cycle counts may be used for determining whether the memory device has been removed from the computing device or is still deployed on the same computing device as during the previous power cycle. By comparing the memory count and the host count, the method may yield the advantage that a removal of the memory device from the computing device may be detected with a high reliability. By preventing readout of data from the memory if the memory power cycle count and the host power cycle count do not match, the method may provide an improved protection of data stored by the memory from unauthorized access, as it may occur when an attacker is stealing the memory from its original computing device.

In an example, the security reaction comprises marking the memory with a status indicator discouraging the readout. This may reduce the probability that the data can be accessed, as this may require usage of a mechanism that allows for overriding or ignoring the status indicator. Another advantage of marking the memory may be that setting a status indicator may consume less computing resources of the memory device than many other approaches of preventing the readout. For instance, marking a block of memory cells may require writing merely a small number of bits (e.g., down to one bit), while, e.g., physically erasing the data from the block may require performing a write operation on all cells of the block (e.g., thousands or millions of cells). For instance, the status indicator may be indicative of a status of the memory selected from the group consisting of corrupted, damaged, invalid, and/or empty. The memory controller and/or software issuing a read command directed to the memory may be configured to perform no read operations on portions of memory marked as corrupted, damaged, invalid, and/or empty, as reading data from such memory may yield data of low integrity or no data at all. A status indicator for the entire memory, or multiple corresponding status indicators for portions of the memory (e.g., blocks, pages, etc.), may be stored at a storage location of the memory or the memory device reserved for storing memory metadata.

In an example, the method further comprises setting the memory power cycle count to the host power cycle count upon a first usage of the memory device. This may facilitate, e.g., a hardware upgrade of a computing device having undergone multiple power cycles with a new memory device having counted zero or only a few power cycles (e.g., from testing the memory after manufacturing). An alternative approach for new memory devices may be to record a constant offset at the first usage (e.g., a difference between the memory count and the host count) that is added to or subtracted from the memory count or the host count by default before performing the comparison. A first usage of the memory may be detected, e.g., by reading a status indicator indicating a first usage of the memory device after manufacturing, or by reading the memory count having a value specific for memory devices that have never been used after manufacturing (e.g., zero, or a preset negative value, or a positive value indicating a known constant number of power cycles undertaken during memory testing after manufacturing).

In an example, the security reaction comprises encrypting the data. This may render the data useless even if it is read from the memory, as the plain text of the data is not stored by the memory. The data may be encrypted, e.g., using a hash function, a symmetric cryptographic key, or an asymmetric cryptographic key. Optionally, decryption of the data may be exclusively possible, e.g., by the computing device where the memory device was originally installed (the "original computing device"), or by a trusted entity such as a manufacturer or assembler of the memory device in the original computing device.

In an example, the security reaction comprises locking access to the memory. This may render any read attempts for the data impossible, as, for instance, all read commands directed to the memory may be denied. Optionally, the memory device is configured to unlock the access again in response to receiving matching credentials from the original computing device or trusted entity.

In an example, the security reaction comprises converting the memory to a reserved memory region unavailable for data storage. This may make a readout of the data impossible, as the reserved memory region may be inaccessible for any read commands received by the memory device. For instance, the memory may be converted to a metadata storage that has no address that can be called by a read command the memory device receives.

In an example, the method further comprises obtaining an undo key, the security reaction being undoable using a key matching the undo key. This may allow for regaining access to the data by authorized entities having the matching key. In this way, data loss may be prevented in cases when the security reaction was initiated accidentally (e.g., in case of a count error that may occur, e.g., if the memory device or the computing device are in an undefined state during a power-up event). The undo key may be defined in various ways, such as a set of credentials, a cryptographic certificate, a cryptographic key, a definition of an inverse function enabling decrypting or un-hashing the data, etc. Without limitation, the undo key may be generated and stored, e.g., during manufacturing of the memory device, or during a cryptographic handshake procedure performed together with the computing device during a first use of the memory device.

In an example, the undo key is derived from the memory power cycle count. This may facilitate recovery of the data if the memory is reconnected to the original computing device during the same power cycle when it was removed. This may provide protection from accidental loss of the data, e.g., if the memory is installed in a different computing device during an authorized maintenance operation of the computing device and reinstalled in the original computing device shortly after. For instance, the security reaction may comprise generating the unlock key based on the memory count stored on the memory device, and the method may further comprise, in response to a power-up of the memory device after completion of the security reaction, generating a test key based on the received host count, and if the host count equals the memory count, the second key may be equal to the matching key required to regain access to the data stored by the memory.

In an example, the method further comprises storing the memory power cycle count in a read-protected memory. This may improve the access protection of the data as it may be impossible to obtain knowledge of the memory count outside the memory. For instance, the memory count may be stored in a register or other storage location of onboard the memory device that cannot be addressed by a read command received by the memory device. Thus, an attacker may be unable to read the data from the memory by reading the memory count from the memory device and installing the memory device in a computing device emulating the original computing device by setting its host count to the read memory count.

In an example, the security reaction further comprises destroying the memory power cycle count by reprogramming a register storing the memory power cycle count. This may improve the access protection of the data as it may be impossible to reconstruct the correct memory count from a reprogrammed (e.g., erased or falsified) memory count. Thus, an attacker may be unable to read the data from the memory by reading the memory count from the memory device and installing the memory device in a computing device emulating the original computing device by setting its host count to the read memory count. The term "register" shall be understood as being representative of any memory structure used for storing the memory count.

In an example, the security reaction comprises destroying semantic coherence of the data. This may be achieved by performing read/write operations on a portion of the data that change the semantic content of the data. In this manner, the falsified data may be useless even when read from the memory, thus protecting the data that were originally stored by the memory from unauthorized access. Destroying semantic coherence of the data may consume less computing resources than physically erasing or falsifying the entire data as a smaller number of read/write operations may be necessary to falsify the data. For instance, multiple cells, lines, words, pages, blocks, etc. of the memory may be rewritten with random data or may undergo a permutation of their data.

In an example, the destruction comprises physically erasing the data. This may prevent a reconstruction of the data originally stored by the memory as the physical state of the memory cells that was set for encoding the data may be changed. Moreover, erasure of the data may prevent a reconstruction of portions of the data and may thus provide a stronger protection of the data. For instance, the memory cells may be configured for storing the data in a binary manner, or may be multi-level cells (e.g., multi-level cells, MLC, or double-level cells, DLC, triple-level cells, TLC, etc.), wherein physically erasing the data may comprise programming the cells to their respective logical dataless state, e.g., "0", "1", "00", etc.

In an example, the security reaction comprises physically destroying the memory device. This may render the data permanently inaccessible, providing an improved protection of the data, as the memory device may cease functioning and may be unable to respond to read commands anymore, or may respond to a read command by returning a signal without a semantic content. Physical destruction may be achieved by setting an operational parameter of the memory or other component of the memory device to exceed a specification that is required to warrant correct operation of the memory device. For instance, an electrical parameter (e.g., a voltage and/or a current) of the memory and/or a different electrical component (e.g., a capacitor, a resistor, a chip, etc.) may be set to an unspecified value, change polarity, etc. In order to ensure an effective destruction, the parameter used for destroying the memory device may be set to exceed its respective specified or rated range far enough to ensure an irreversible damage to the memory device.

In an example, the method further comprises setting the memory power cycle count equal to the host power cycle count if the host power cycle count does not differ from the memory power cycle count by more than a predefined tolerance value. This may be beneficial for taking into account exceptional cases when either the memory count and or the host count are not incremented (e.g., of a power outage or other event causing an interruption of the power-up of the computing device and/or the memory device, or a temporary hardware failure of the memory device or another component of the computing device) without encountering a prompt access denial to the data stored by the memory. As a result, the memory device and the computing device may continue maintaining slightly different power cycle counts although the memory device has not been removed from the computing device. A tolerance value greater than 1 may be selected to accommodate an accumulation of such exceptions, where it may be beneficial to select the tolerance value as small as possible to reduce the probability that the host power cycle count of a computing device possibly used during an unauthorized attempt of reading the data accidentally lies within the range defined by the memory count or the host count plus or minus the tolerance value.

In an example, the tolerance value is less than or equal to 5, preferably (but not a necessity) equal to 1. A tolerance value of 5 may be a reasonably low tolerance value allowing for counting mistakes that are infrequent enough to assume that they will not occur more often than 5 times during the total time the memory device is deployed on the same computing device. A tolerance value of 1 may provide a greater extent of protecting the data when it can be assumed that a mismatch between the power cycle values is practically excluded.

In an example, a portion of the memory is exempt from the security reaction. This may allow for continuing usage of the portion of the memory that is not affected by the security reaction. If the computing devices uses the memory as a primary memory or RAM, a failure of operating the computing device due to restricted access to the entire memory (e.g., if the memory device is the only memory device installed in the computing device) may be avoided. In a case where the application of the security reaction was unjustified (e.g., although the memory has not been removed from the computing device, e.g., as a result of a counting mistake of the memory count or the host count), the continued operability of the computing device may facilitate restoring the access to the protected memory portion (e.g., using an unlock mechanism as described herein) if the implemented security reaction is reversible. For the purpose of data protection, it may be useful to select the size of the accessible, unaffected memory portion as small as possible so as to maximize the amount of data that is protected from access in case the security reaction was justified.

In an example, the memory is (logically or physically) subdivided in a first portion dedicated to general use and a second portion dedicated to storing sensitive data, wherein the portion of the memory exempt from the security reaction is the first portion. In this way, fulfilling the opposing requirements of a high availability of the memory and protecting sensitive data stored by the memory at the same time may be facilitated.

In an example, the method further comprises applying the security reaction to the memory if the receipt of the host power cycle count fails. If the processor performing the method expects the receipt of the host count, but the host count cannot be obtained, this may be interpreted as an indication that the memory is deployed on a computing device that is not configured for maintaining a host power cycle count, which may indicate in turn that the current computing device does not have the same configuration as the original computing device and may thus be unauthorized for reading the data stored by the memory. Hence, performing the security reaction also in this case may provide additional protection for the data.

In an example, the memory is a solid-state memory. It may be especially beneficial to implement the method for protecting data stored on a solid-state memory because solid-state memory may have a higher information density than other (e.g., magnetic) storage media, which may enable a design of the memory device with smaller dimensions, which may put solid-state memory devices at a higher risk of being stolen unnoticedly.

In an example, the security reaction additionally comprises transmitting an alert message to a user of the computing device. For instance, a communications (e.g., network) interface of the computing device on which the memory device is currently deployed may be used to transmit the alert message, or the alert message may be displayed to a user via a user interface of the computing device. Transmitting an alert message to a user may include storing in a log file an entry informing about the performance of the security reaction (e.g., a timestamp when the security reaction was performed, a kind of the performed security reaction, an identifier of an interface (e.g., an internal memory slot or an internal device port of the computing device) providing the functional coupling of the memory device to the computing device, etc.). An alert message may be composed in a manner that may discourage an unauthorized user from further attempts of accessing the data. This may improve protection of the data and may enable restoring the data if the unauthorized person reacts to the message in a non-destructive manner.

FIG. 1 depicts a block diagram showing exemplary components of a computing device 100 that may be adapted for performing the method of protecting data stored by a non-volatile memory of a memory device installed in a computing device disclosed herein. It is understood that the depiction of computing device 100 in FIG. 1 may be simplified and that the computing device 100 may comprise various additional components not shown in the drawing. The computing device 100 comprises a memory device 120 and a processor 110 that is functionally coupled to non-volatile memory 130 onboard the memory device 120 such that the processor 110 can exchange information, signals, and data with the memory 130. The use of the memory 130 by the computing device 100 is not restricted, i.e., the memory 130 may be a primary memory or random-access memory (RAM), a mass storage device, a cache, etc.

The processor 110 may be adapted for processing a power-up routine 114 that may be hardcoded to the processor 110 or may be implemented as a set or block of instructions stored in a non-volatile internal memory 112 of the processor 110, as shown in FIG. 1. The power-up routine 114 may comprise various sub-routines such as counting functions, health-check functions, etc. Among the sub-routines implemented by the power-up routine 114 may be a function of counting a number 116 of power-up events of the processor 110 that is referred to herein as the host power cycle count 116 or, in short, the host count 116. In the example of FIG. 1, the power-up counting function may be configured for reading the host count 116 from the internal processor memory 112, incrementing the host count 116, and storing the incremented host count in the internal processor memory 112. The processor 110 may be a generic or purpose-built processor such as a central processing unit (CPU), a graphics processing unit (GPU), or another chip (e.g., a controller chip such as ESP8266, Atmega32u4, or similar) onboard the computing device 100 with the exception of the memory device 120. The internal memory 112 may be a register, a cache, or other non-volatile memory onboard the processor 110.

Figure 2:
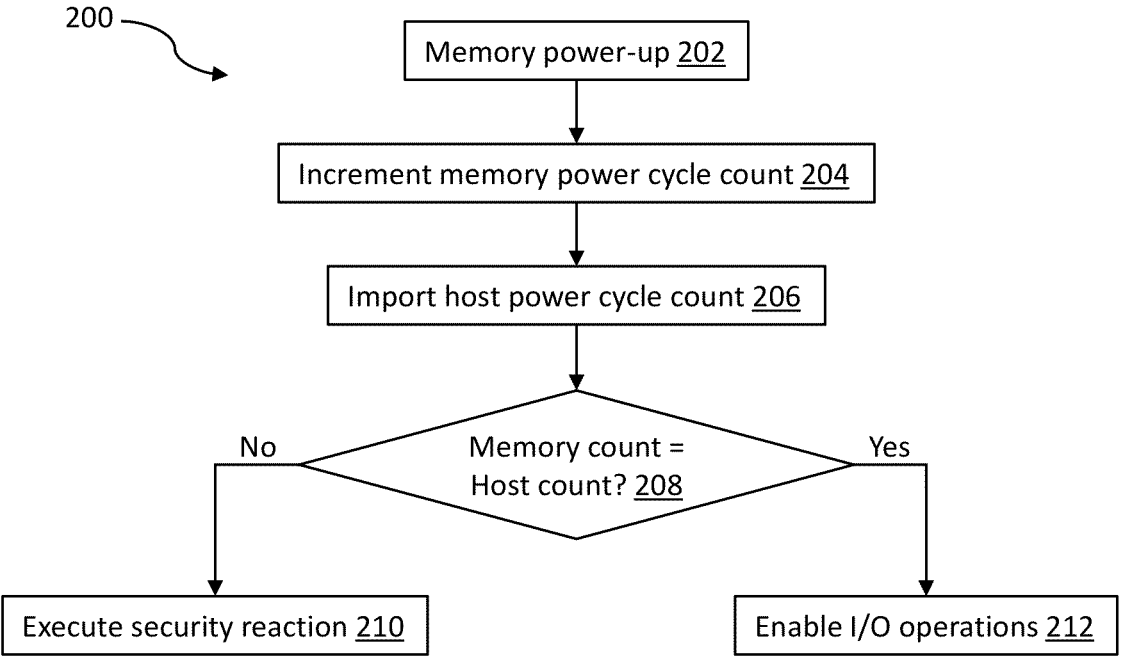
FIG. 2 depicts a flow diagram illustrating steps of a method of protecting data stored by a non-volatile memory of a memory device installed in a computing device.

The memory device 120 may comprise non-volatile memory 130 and a memory controller 120 configured for operating the memory 130. The controller 120 may be adapted for processing a power-up routine that may be hardcoded to the controller 120 or may be implemented as a set or block of instructions stored in a non-volatile internal memory 124 of the controller 120. The power-up routine may comprise various sub-routines such as counting functions, health-check functions, etc. Among the sub-routines implemented by the power-up routine may be a code block 126 implementing the method 200 of protecting data stored by a non-volatile memory of a memory device installed in a computing device disclosed herein. FIG. 2 depicts a flow diagram schematically illustrating steps of the method 200.

The method 200 may implement a function of counting 204 a number 128 of power-up events of the memory device 130 that is referred to herein as the memory power cycle count 128 or, in short, the memory count 128. In the example of FIG. 1, the memory count 128 may be stored by the internal controller memory 124. The internal controller memory 124 may be a register, a cache, or other non-volatile memory onboard the controller 122 or the memory device 120, including the non-volatile memory 130. In response to a power-up event 202 of the memory device 120, the method 200 may comprise reading the memory count 128 from the internal controller memory 124, the other internal memory of the memory device 120, or the memory 130; incrementing 204 the memory count 128, and storing the incremented memory count 128 in the memory from where it was read.

The method 200 may further be configured for receiving or importing 206 the host count 116 from the processor 110, incrementing the memory count 128, and comparing 208 the memory count 128 to the received host count 116. If necessary, the method 126 may be configured to add or subtract corrective constants to or from the received host count 116 and/or the memory count 128 before comparing 208 the (corrected) host count 116 and the (corrected) memory count 128. If the comparison 208 shows that the (corrected) host count 116 and the (corrected) memory count 128 are equal, the controller 122 may continue by completing the power-up routine of the memory device 120 and to operate 212 the memory 130 according to its normal specification. If the (corrected) host count 116 and the (corrected) memory count 128 are inequal, the controller 122 may implement a security reaction 210, as described herein, that may prevent some or all of data possibly stored by the memory 130 from being read, i.e., that may prevent the memory device 120 from generating a signal leaving the memory device 120 and carrying information incorporating a copy of a portion of data stored by the memory 130.

It is understood that various details shown in FIG. 1, in particular features relating to the internal memory 112, the host power cycle count 116, the internal memory 124, the method 126 and the memory power cycle count 128, may represent a specific choice of implementation that is shown here for the sole purpose of illustration and may be realized in many alternative manners not shown in the drawings.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of protecting data stored by a non-volatile memory of a memory device installed in a computing device, the method comprising:
   in response to a power-up of the memory device, incrementing a memory power cycle count, wherein the memory power cycle count is a number of power-ups of the memory device;
   receiving a host power cycle count indicating a number of power-ups of the computing device;
   comparing the memory power cycle count of the number of the power-ups of the memory device to the host power cycle count of the number of the power-ups of the computing device;
   determining that the memory power cycle count of the number of the power-ups of the memory device is equal within a constant offset to the host power cycle count of the number of the power-ups of the computing device, wherein the constant offset is based on a first usage of the memory device, a hardware upgrade, or a default operation before performing the comparison of the memory power cycle count to the host power cycle count; and
   in response to the memory power cycle count not being equal to the host power cycle count, applying a security reaction to the memory device, the security reaction being adapted for preventing a readout of the data.

2. The method of claim 1, wherein the security reaction comprises marking the memory device with a status indicator discouraging the readout; and
   wherein incrementing the number of the power-ups of the memory device is distinct from incrementing the number of the power-ups of the computing device.

3. The method of claim 2, wherein the status indicator is indicative of a status of the memory device, the status comprising corrupted, damaged, invalid, or empty.

4. The method of claim 1, wherein the security reaction comprises encrypting the data.

5. The method of claim 1, wherein the security reaction comprises locking access to the memory device.

6. The method of claim 1, wherein the security reaction comprises converting the memory device to a reserved memory region unavailable for data storage.

7. The method of claim 1, further comprising obtaining an undo key, the security reaction being undoable using a key matching the undo key.

8. The method of claim 1, further comprising storing the memory power cycle count in a read-protected memory.

9. The method of claim 1, wherein the security reaction further comprises destroying the memory power cycle count by reprogramming a register storing the memory power cycle count.

10. The method of claim 1, wherein the security reaction comprises destroying semantic coherence of the data.

11. The method of claim 10, wherein destroying the semantic coherence of the data comprises physically erasing the data.

12. The method of claim 1, wherein the security reaction comprises physically destroying the memory device.

13. The method of claim 1, further comprising applying the security reaction to the memory device in response to a receipt of the host power cycle count failing.

14. The method of claim 1, further comprising setting the memory power cycle count equal to the host power cycle count in response to the host power cycle count not differing from the memory power cycle count by more than a pre-defined tolerance value; and wherein the predefined tolerance value is generated based on a power outage or a hardware failure.

15. The method of claim 14, wherein:

the predefined tolerance value is less than or equal to 5; or the predefined tolerance value is equal to 1.

16. The method of claim 1, wherein a portion of the memory device is exempt from the security reaction.

17. A computer program product comprising a computer readable storage medium having program instructions embodied therewith, the program instructions being executable by a processor functionally coupled to a non-volatile memory of a memory device installed in a computing device to cause the processor to perform a method of protecting data stored by the memory device, the method comprising:

in response to a power-up of the memory device, incre-menting a memory power cycle count, wherein the memory power cycle count is a number of power-ups of the memory device;

receiving a host power cycle count indicating a number of power-ups of the computing device;

comparing the memory power cycle count of the number of the power-ups of the memory device to the host power cycle count of the number of the power-ups of the computing device;

determining that the memory power cycle count of the number of the power-ups of the memory device is equal within a constant offset to the host power cycle count of the number of the power-ups of the computing device, wherein the constant offset is based on a first usage of the memory device, a hardware upgrade, or a default operation before performing the comparison of the memory power cycle count to the host power cycle count; and in response to the memory power cycle count not being equal to the host power cycle count, applying a security reaction to the memory device, the security reaction being adapted for preventing a readout of the data.

18. The computer program product of claim 17, wherein the security reaction comprises marking the memory device with a status indicator discouraging the readout.

19. A memory controller, configured for controlling a non-volatile memory of a memory device installed in a computing device, the controlling comprising performing a method of protecting data stored by the memory device, the method comprising:

in response to a power-up of the memory device, incre-menting a memory power cycle count, wherein the memory power cycle count is a number of power-ups of the memory device;

receiving a host power cycle count indicating a number of power-ups of the computing device;

comparing the memory power cycle count of the number of the power-ups of the memory device to the host power cycle count of the number of the power-ups of the computing device;

determining that the memory power cycle count of the number of the power-ups of the memory device is equal within a constant offset to the host power cycle count of the number of the power-ups of the computing device, wherein the constant offset is based on a first usage of the memory device, a hardware upgrade, or a default operation before performing the comparison of the memory power cycle count to the host power cycle count; and in response to the memory power cycle count not being equal to the host power cycle count, applying a security reaction to the memory device, the security reaction being adapted for preventing a readout of the data.

20. The memory controller of claim 19, wherein the security reaction comprises marking the memory device with a status indicator discouraging the readout.

* * * * *